United States Patent
Li et al.

(10) Patent No.: US 12,469,135 B2
(45) Date of Patent: Nov. 11, 2025

(54) AUTOMATIC MYOCARDIAL SEGMENTATION METHOD IN TWO-DIMENSIONAL ECHOCARDIOGRAPHY

(71) Applicant: Shantou Institute of Ultrasonic Instruments Co., Ltd., Shantou (CN)

(72) Inventors: Delai Li, Shantou (CN); Liexiang Fan, Shantou (CN); Zhonghong Wu, Shantou (CN); Bin Li, Shantou (CN); Yuqiang Kang, Shantou (CN); Haomiao Qiu, Shantou (CN); Yu Wang, Shantou (CN); Zhongyun Wei, Shantou (CN)

(73) Assignee: Shantou Institute of Ultrasonic Instruments Co., Ltd., Shantou (CN)

( * ) Notice: Subject to any disclaimer, the term of this patent is extended or adjusted under 35 U.S.C. 154(b) by 287 days.

(21) Appl. No.: 18/490,111

(22) Filed: Oct. 19, 2023

(65) Prior Publication Data
US 2024/0312006 A1     Sep. 19, 2024

Related U.S. Application Data

(63) Continuation of application No. PCT/CN2023/082371, filed on Mar. 18, 2023.

(30) Foreign Application Priority Data

Mar. 15, 2023  (CN) .......................... 202310243884.2

(51) Int. Cl.
*G06K 9/00*    (2022.01)
*G06T 7/00*    (2017.01)
(Continued)

(52) U.S. Cl.
CPC .............. *G06T 7/0012* (2013.01); *G06T 7/11* (2017.01); *G06V 10/26* (2022.01); *G06V 10/44* (2022.01); *G06T 2207/30048* (2013.01)

(58) Field of Classification Search
CPC ... G06T 2207/30048; G06T 7/11; G06T 7/12; G06T 7/0012; G06T 2207/10132;
(Continued)

(56) References Cited

U.S. PATENT DOCUMENTS

| 2008/0304730 | A1* | 12/2008 | Abe ........................ G06T 7/12 382/131 |
| 2011/0262018 | A1* | 10/2011 | Kumar .................. G06T 7/0012 382/131 |
| 2022/0370033 | A1* | 11/2022 | Klingensmith ........ A61B 34/10 |

OTHER PUBLICATIONS

Guo, Y., Du, G. Q., Xue, J. Y., Xia, R., & Wang, Y. H. (2017). A novel myocardium segmentation approach based on neutrosophic active contour model. Computer methods and programs in biomedicine, 142, 109-116. (Year: 2017).*

* cited by examiner

*Primary Examiner* — Gregory A Morse
*Assistant Examiner* — Kevin M Coomber
(74) *Attorney, Agent, or Firm* — Westbridge IP LLC

(57) ABSTRACT

An automatic myocardial segmentation method in two-dimensional echocardiography includes: calculating and extracting ridge information in two-dimensional echocardiography; extracting image skeleton data, and connecting fragmented skeleton data to obtain continuous skeleton data by using interpolation; screening the continuous skeleton data, and extracting two optimal paths from a top to a bottom based on a myocardial feature to obtain left and right myocardial skeletons; extracting a set of feature point candidates from the left and right myocardial skeletons, and selecting a pair of key matching feature points from the set (Continued)

of feature point candidates as anchor points based on the myocardial feature; entering anchor point data and left and right myocardial skeleton data in a mathematical model of heart chambers to fit the morphology of heart chambers and obtain an initial myocardial contour; and constructing a myocardial feature energy equation.

3 Claims, 1 Drawing Sheet

(51) Int. Cl.
*G06T 7/11* (2017.01)
*G06V 10/26* (2022.01)
*G06V 10/44* (2022.01)

(58) Field of Classification Search
CPC ......... A61B 8/0883; A61B 34/10; A61B 8/08; A61B 8/00; G06V 2201/031; G06V 10/44; G06V 10/26
See application file for complete search history.

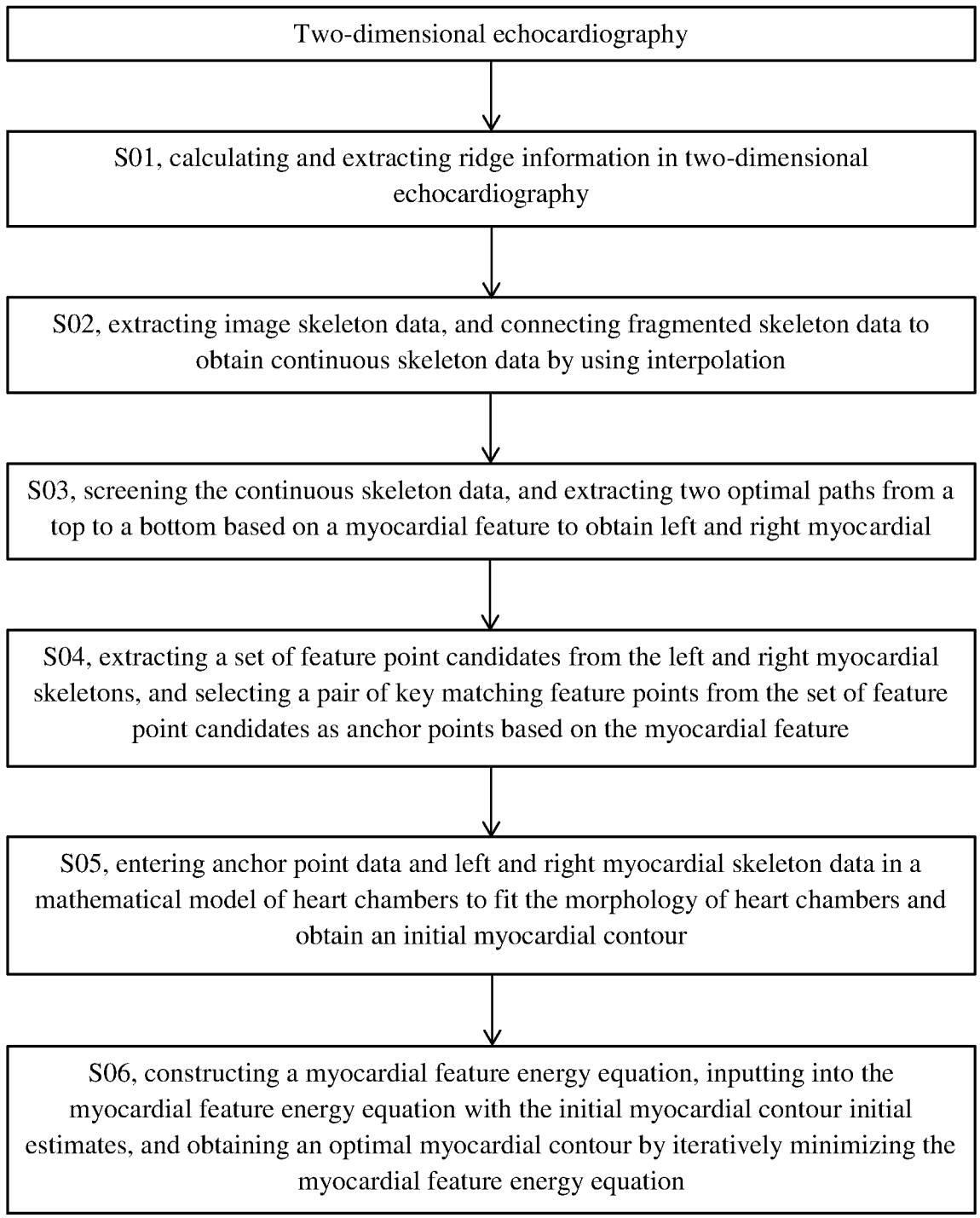

AUTOMATIC MYOCARDIAL SEGMENTATION METHOD IN TWO-DIMENSIONAL ECHOCARDIOGRAPHY

CROSS-REFERENCE TO RELATED APPLICATIONS

This application is a continuation of International Application No. PCT/CN2023/082371, filed on Mar. 18, 2023, which claims priority to Chinese Patent Application No. 202310243884.2, filed on Mar. 15, 2023. All of the aforementioned applications are incorporated herein by reference in their entireties.

TECHNICAL FIELD

The present application relates to the field of ultrasound image processing technology, in particular to an automatic myocardial segmentation method in two-dimensional echocardiography.

BACKGROUND

Two-dimensional echocardiography can be used to track myocardial motion, and through qualitative and quantitative analysis of myocardial motion, non-invasive assessment of cardiac functions can be achieved. Most of the current technology is the use of machine learning or pattern recognition and other methods, which requires a large amount of image data for training, and when recognizing the myocardial contour, it requires a large amount of calculation, and the computational power and storage requirements of the computer are high. In addition, the current resolution requirement for the method in two-dimensional echocardiography imaging is high due to higher requirements for image acquisition equipment, which limits its application in clinical diagnostics.

SUMMARY

The present application relates to the field of ultrasound image processing technology, in particular to an automatic myocardial segmentation method in two-dimensional echocardiography. The following technical solution is used: using the basic image processing algorithm to extract ridge and skeleton information, screening out the left and right myocardial skeletons, extracting feature points and selecting a pair of anchor points, and then fitting the rough myocardial contour in the mathematical model of the heart chambers according to the anchor point and the left and right myocardial skeleton, and finally obtaining the optimal myocardial contour by starting with the initial contour and minimizing myocardial feature energy equation iteratively. The beneficial effects of using the fundamental image processing algorithm to extract significant features from the two-dimensional echocardiogram based on the unique myocardial contour itself, determining and segmenting the anatomy and specific contour of the myocardium according to the existing mathematical model of the heart chambers and the myocardial feature energy equation, are for the objective to achieve low requirements for the computational power and storage, image processing adaptability and robustness.

In detail, the objective of the present application is to provide an automatic myocardial segmentation method in two-dimensional echocardiography, specifically to provide a method for myocardial automatic segmentation using a basic image processing algorithm according to the feature of the myocardium itself, to address the issues mentioned in the background technology.

To achieve the objective above, the present application adopts the following technical solution: a two-dimensional echocardiogram myocardial automatic segmentation method, including the following steps.

S01, calculating and extracting ridge information in two-dimensional echocardiography;

S02, extracting image skeleton data, and connecting fragmented skeleton data to obtain continuous skeleton data by using interpolation;

S03, screening the continuous skeleton data, and extracting two optimal paths from a top to a bottom based on a myocardial feature to obtain left and right myocardial skeletons;

S04, extracting a set of feature point candidates from the left and right myocardial skeletons, and selecting a pair of key matching feature points from the set of feature point candidates as anchor points based on the myocardial feature;

S05, entering anchor point data and left and right myocardial skeleton data in a mathematical model of heart chambers to fit the morphology of heart chambers and obtain an initial myocardial contour; and S06, constructing a myocardial feature energy equation, inputting into the myocardial feature energy equation with the initial myocardial contour initial estimates, and obtaining an optimal myocardial contour by iteratively minimizing the myocardial feature energy equation.

Specifically in S01, when calculating the ridge information extracted from the two-dimensional echocardiogram, the two-dimensional echocardiography used is a region of interest image containing the main myocardial image taken in a complete two-dimensional echocardiogram Specifically, in S01, the complete two-dimensional echocardiogram is acquired as follows: a complete sequence of two-dimensional echocardiograms is acquired, and any frame of two-dimensional echocardiograms is combined with at least one frame of two-dimensional echocardiograms before and after for image enhancement processing, to obtain the complete two-dimensional echocardiogram.

The beneficial effects of using the fundamental image processing algorithm to extract significant features from the two-dimensional echocardiogram based on the unique myocardial contour itself, determining and segmenting the anatomy and specific contour of the myocardium according to the existing mathematical model of the heart chambers and the myocardial feature energy equation, are for the objective to achieve low requirements for the computational power and storage, image processing adaptability and robustness.

BRIEF DESCRIPTION OF THE DRAWINGS

FIG. 1 illustrates a step-by-step flow chart of the two-dimensional echocardiogram automatic segmentation method in the embodiment and the image processing schematic.

DETAILED DESCRIPTIONS OF THE EMBODIMENTS

Referring to FIG. 1, an automatic myocardial segmentation method in two-dimensional echocardiography includes the following steps:

S01, calculating and extracting ridge information in two-dimensional echocardiography;

S02, extracting image skeleton data, and connecting fragmented skeleton data to obtain continuous skeleton data by using interpolation;

S03, screening the continuous skeleton data, and extracting two optimal paths from a top to a bottom based on a myocardial feature to obtain left and right myocardial skeletons;

S04, extracting a set of feature point candidates from the left and right myocardial skeletons, and selecting a pair of key matching feature points from the set of feature point candidates as anchor points based on the myocardial feature;

S05, entering anchor point data and left and right myocardial skeleton data in a mathematical model of heart chambers to fit the morphology of heart chambers and obtain an initial myocardial contour; and S06, constructing a myocardial feature energy equation, inputting into the myocardial feature energy equation with the initial myocardial contour initial estimates, and obtaining an optimal myocardial contour by iteratively minimizing the myocardial feature energy equation.

The mathematical model of the heart chambers in S05, and the myocardial feature energy equation in S06 are based on the mathematical model and feature energy equation established according to the feature of the myocardial anatomy, through the mathematical model of the heart chambers, and with the anchor point and the left and right heart chambers skeleton as the main input data, the initial contour of the myocardium is fit and obtained. In addition to the above anchor points and left and right heart chambers skeleton as input data, it is also necessary to input the constraint feature information according to the cardiogram of different slices, which belongs to the routine operation in the mathematical model. The constraint feature information for different slices of the cardiogram can be calculated and selected in advance as required, by using the myocardial feature energy equation, and the myocardial initial contour as input data, and by using the iterative calculation, the optimal myocardial contour can be obtained. The iterative calculation, that is, using the myocardial initial contour as the initial input data, the output data calculated by the myocardial feature energy equation as the new input data, and then substituted into the myocardial feature energy equation. In this way, several iterative calculations are performed to obtain the optimal myocardial contour.

Specifically in S01, when calculating the ridge information extracted from the two-dimensional echocardiogram, the two-dimensional echocardiography used is a region of interest image containing the main myocardial image taken in a complete two-dimensional echocardiogram, and by intercepting the image of the region of interest containing the main myocardial image, the ridge information extracted in S01, and the amount of computation performed in feature extraction in S02 and S03 can be reduced, thereby improving the speed of operation.

Specifically in S01, the complete two-dimensional echocardiogram is acquired as follows: a complete sequence of two-dimensional echocardiograms is acquired, and any frame of two-dimensional echocardiograms is combined with at least one frame of two-dimensional echocardiograms before and after for image enhancement processing, to obtain the complete two-dimensional echocardiogram, through image enhancement processing, can make the feature of the two-dimensional echocardiogram central muscle region more obvious and improve the accuracy of myocardial segmentation. In addition, the automatic myocardial segmentation method disclosed in the present embodiment can also segment the myocardial region for ordinary images that are noisy and the myocardial wall is not clear.

However, the above is only an optimal embodiment of the present application, but not to limit the scope of use of the present application. Therefore, all equivalent changes in the principles of the present application should be included in the scope of protection of the present application.

What is claimed is:

1. An automatic myocardial segmentation method in two-dimensional echocardiography, comprising:
   S01, calculating and extracting ridge information in two-dimensional echocardiography;
   S02, extracting image skeleton data, and connecting fragmented skeleton data to obtain continuous skeleton data by using interpolation;
   S03, screening the continuous skeleton data, and extracting two optimal paths from a top to a bottom based on a myocardial feature to obtain left and right myocardial skeletons;
   S04, extracting a set of feature point candidates from the left and right myocardial skeletons, and selecting a pair of key matching feature points from the set of feature point candidates as anchor points based on the myocardial feature;
   S05, entering anchor point data and left and right myocardial skeleton data in a mathematical model of heart chambers to fit a morphology of heart chambers and obtain an initial myocardial contour; and
   S06, constructing a myocardial feature energy equation, inputting into the myocardial feature energy equation with the initial myocardial contour, and obtaining an optimal myocardial contour by iteratively minimizing the myocardial feature energy equation.

2. The automatic myocardial segmentation method in two-dimensional echocardiography according to claim 1, wherein in S01, when calculating the ridge information extracted from the two-dimensional echocardiogram, the two-dimensional echocardiography used is a region of interest image containing the main myocardial image taken in a complete two-dimensional echocardiogram.

3. The automatic myocardial segmentation method in two-dimensional echocardiography according to claim 2, wherein in S01, the complete two-dimensional echocardiogram is acquired as follows: a complete sequence of two-dimensional echocardiograms is acquired, and any frame of two-dimensional echocardiograms is combined with at least one frame of two-dimensional echocardiograms before and after for image enhancement processing, to obtain the complete two-dimensional echocardiogram.

\* \* \* \* \*